(12) United States Patent
Siu

(10) Patent No.: US 7,610,516 B2
(45) Date of Patent: Oct. 27, 2009

(54) RECORDING ANALOG CHARACTERISTICS OF DATA FROM A DATA LINE IN A PROTOCOL ANALYZER

(76) Inventor: Sai Pong Siu, P.O. Box 4367, Santa Clara, CA (US) 95056

( * ) Notice: Subject to any disclaimer, the term of this patent is extended or adjusted under 35 U.S.C. 154(b) by 383 days.

(21) Appl. No.: 11/407,522

(22) Filed: Apr. 20, 2006

(65) Prior Publication Data

US 2007/0260933 A1    Nov. 8, 2007

(51) Int. Cl.
 *G06F 11/00*    (2006.01)
(52) U.S. Cl. .......................... 714/45; 714/37
(58) Field of Classification Search ............... 714/39, 714/37, 25, 47, 45
See application file for complete search history.

(56) References Cited

U.S. PATENT DOCUMENTS

| 7,403,560 | B2 * | 7/2008 | Gamper et al. .............. 375/228 |
| 2004/0243894 | A1 * | 12/2004 | Smith et al. ................ 714/724 |
| 2005/0201488 | A1 * | 9/2005 | Duff et al. .................. 375/316 |

* cited by examiner

*Primary Examiner*—Dieu-Minh Le

(57) ABSTRACT

This disclosure relates to systems and methods for recording analog characteristics of data. In one example embodiment, a method for recording and outputting a waveform in a protocol analyzer includes receiving analog data, converting the analog data to digital data that represents variations in a signal characteristic of the analog data over time, storing a sample of the digital data in a memory of a protocol analyzer; and presenting the sample of the digital data as a waveform on a user interface of the protocol analyzer.

8 Claims, 3 Drawing Sheets

RECORDING ANALOG CHARACTERISTICS OF DATA FROM A DATA LINE IN A PROTOCOL ANALYZER

BACKGROUND OF THE INVENTION

1. The Field of the Invention

Embodiments of the invention relate to systems and methods for analyzing data. More particularly, embodiments of the invention relate to systems and methods for recording analog characteristics of data from a data line in a protocol analyzer.

2. Related Technology

In order for a communication system, such as a network or system bus, to be effective and operate at peak performance, it is often necessary to have an understanding of what is happening to the data in the system. One type of instrument used to achieve this goal and to understand what is happening in the system is a protocol analyzer or monitor. Protocol analyzers can provide a detailed view of what is happening in communication system environments. A protocol analyzer can be used to test or evaluate a communication system by automatically capturing data and then analyzing the captured data. A protocol analyzer is often embodied as a combination of hardware and software. Some example communication system environments in which a protocol analyzer can be used include a system bus, a storage area network ("SAN"), a local area network ("LAN"), or a wide area network ("WAN").

There is often a desire to quickly resolve complex problems in communication system communications. While protocol analyzers enable a rapid resolution of complex problems, protocol analyzers can also identify potential problems and the conditions that lead to potential problems before potential problems become critical and negatively impact the performance of the communication system. The resolution of events or situations in a communication system that cause problems can enable users to more effectively design, implement, and evaluate their communication systems and their communication system components.

One approach to problem identification, analysis, and resolution in communications systems involves capturing a portion of the data traffic for review and analysis. In some cases, such data capture is performed in connection with an analyzer that includes various hardware and software elements configured to capture data from one or more data lines in the communications system, and to present the captured data in various formats to a user or technician by way of a graphical user interface or other presentation device. The captured data is often referred to as a trace.

The hardware of a protocol analyzer may include a tap that can be placed in-line in a data line of a network. A tap can also be non-intrusive. When an event occurs or is detected, a capture process is triggered. The capture process then captures data constituting the trigger event into one or more buffers. Examples of events that can trigger a protocol analyzer to capture data include the occurrence of certain bit patterns, protocol patterns, and network commands. Software typically provides processing functionality to sort through the one or more buffers and identify information related to the event that triggered the data capture.

Another type of instrument used to understand what is happening in a communication system is an oscilloscope, also known simply as a scope. A scope is a piece of electronic test equipment that creates a visible two-dimensional graph of one or more electrical potential differences. The horizontal axis of the display typically represents time, making the instrument useful for displaying periodic signals. The vertical axis typically shows variations in a signal characteristic, such as voltage. Scopes are often used by users to evaluate the analog signal coming across a communication system. This visual presentation of network traffic can help a user to diagnose the problems in the communication system traffic.

A scope can be used in combination with a protocol analyzer. However, working with separate protocol analyzer and scope devices is cumbersome. Further, correlating information obtained by a protocol analyzer and information obtained by a scope is also difficult.

BRIEF SUMMARY OF SOME EXAMPLE EMBODIMENTS OF THE INVENTION

These and other limitations are overcome by embodiments of the invention, which relate to systems and methods for recording analog characteristics of data from a data line in a protocol analyzer.

In one example embodiment, a method for recording and outputting a waveform includes receiving analog data from an analog data line of a protocol analyzer; converting the analog data to digital data that represents variations in a signal characteristic of the analog data over time; storing a sample of the digital data in a memory of the protocol analyzer; and presenting the sample of the digital data as a waveform on a user interface of the protocol analyzer.

In another example embodiment, a method for recording and outputting a waveform includes sampling analog data from an analog data line of a protocol analyzer in response to the occurrence of a user-specified event; converting the sample analog data to digital data that represents variations in a signal characteristic of the sample analog data over time; storing the digital data in a memory of the protocol analyzer; and presenting the digital data as a waveform.

In another example embodiment, a protocol analyzer that is configured to record and output a waveform includes an analyzer module and a waveform capture module. In this example embodiment, the analyzer module includes a trace buffer. Also, in this example embodiment, the waveform capture module includes an analog-to-digital converter. The input of the analog-to-digital converter includes an analog data stream and the output of the analog-to-digital converter includes a digital data stream that corresponds to the analog data stream. The digital data stream represents variations in a signal characteristic of the analog data stream over time. The waveform capture module also includes a filter. The input of the filter includes the digital data stream output from the analog-to-digital converter and the output of the filter includes those portions of the digital data stream that correspond to a user-specified event. The waveform capture module also includes a memory. The input and output of the memory include the portions of the digital data stream output from the filter. The protocol analyzer in this example embodiment also includes a user interface. The input of the user interface includes the portions of the digital data stream output from the memory and the output of the user interface includes the portions of the digital data stream output from the memory presented as a waveform.

These and other aspects of example embodiments of the present invention will become more fully apparent from the following description and appended claims.

BRIEF DESCRIPTION OF THE DRAWINGS

To further clarify certain aspects of the present invention, a more particular description of the invention will be rendered by reference to specific embodiments thereof which are disclosed in the appended drawings. It is appreciated that these drawings depict only example embodiments of the invention and are therefore not to be considered limiting of its scope. Aspects of the invention will be described and explained with additional specificity and detail through the use of the accompanying drawings in which.

DETAILED DESCRIPTION OF EXAMPLE EMBODIMENTS

Example embodiments relate to systems and methods for analyzing data. More particularly, embodiments of the invention relate to systems and methods for recording analog characteristics of data from a data line in a protocol analyzer.

I. Exemplary Environment

Figure 1:
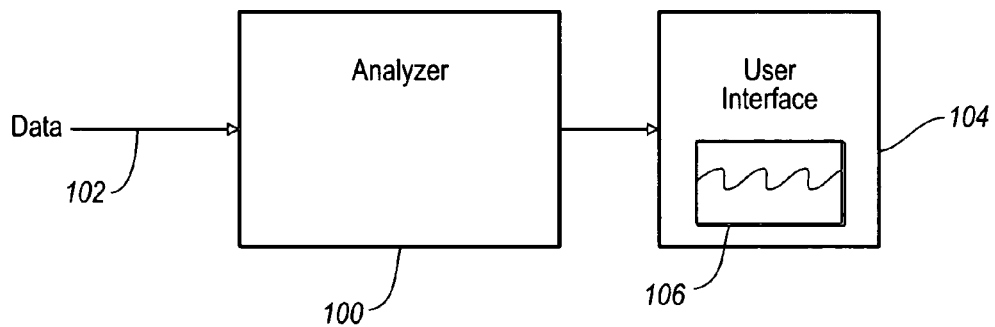
FIG. 1 discloses aspects of an exemplary protocol analyzer environment.

FIG. 1 discloses general aspects of an operating environment for an example protocol analyzer 100. Among other things, protocol analyzer 100 can be used to analyze data in a communication system. Protocol analyzer 100 is connected to a data line 102 of a communication system. Data line 102 carries data within the communication system. Protocol analyzer 100 is also in communication with a user interface 104. User interface 104 can be any conceivable type of user interface, including, but not limited to, a graphical user interface. For example, a display 106 of user interface 104 can be configured to visually display information to users. As disclosed in FIG. 1, display 106 of user interface 104 is configured to display digital data as a waveform, with waveform display functionality similar to the display of a typical scope. The presentation of data on display 106 of user interface 104 can be controlled by hardware, software, or a combination of hardware and software. Although user interface 104 is illustrated in FIG. 1 as being separate from analyzer 100, user interface 104 can be included as part of analyzer 100.

II. Exemplary Protocol Analyzer and Waveform Display

Figure 2:
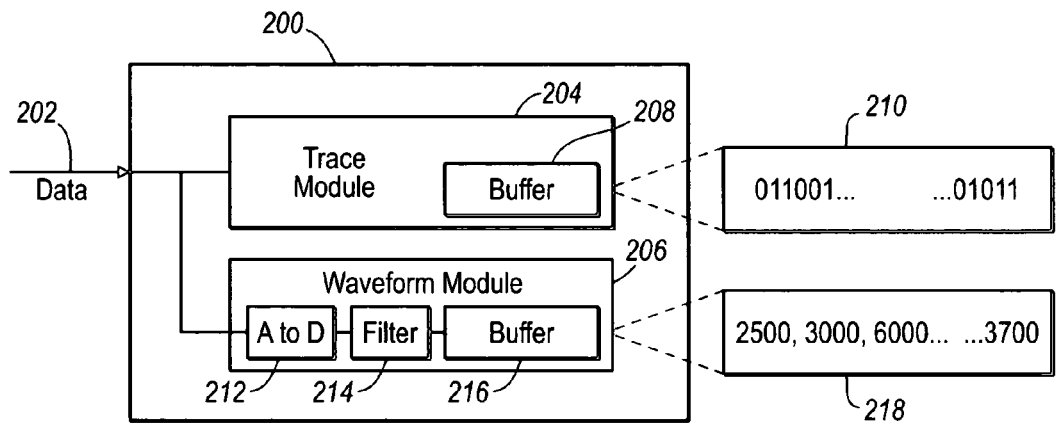
FIG. 2 discloses an exemplary protocol analyzer.

With reference now to FIG. 2, details are provided concerning an example protocol analyzer 200. Protocol analyzer 200 can be implemented as hardware, software, or a combination of hardware and software. Protocol analyzer 200 receives data by way of data line 202. Protocol analyzer 200 includes trace module 204 and waveform module 206.

Data line 202 carries analog data within a communication system. Data line 202 can be, for example, a system bus such as a universal serial bus ("USB"), a parallel bus, or a small computer system interface ("SCSI") bus, an ATA bus, or any of a variety of network communication data lines, such as an Ethernet data line. Protocol analyzer 200 can be placed directly inline to monitor a link. Alternatively, protocol analyzer 200 can be connected to a tap in order to non-intrusively monitor a link.

As noted above, protocol analyzer 200 includes a trace module 204. Trace module 204 is typically configured to monitor data line 202 for certain trigger events, including timeouts and missing events and specific memory conditions. The trigger events that trace module 204 monitors for can be user-specified events, or system specified events that cause performance problems. For example, trace module 204 can be configured to watch for a specific network traffic condition to occur, such as the presence of a certain frame type in the network traffic. When one of these trigger events is detected, a capture process is triggered and trace module 204 captures data constituting the trigger event from data line 202 and stores the data in a trace buffer 208. As used herein, the term "data constituting an event" refers to the data in which an event is identified, which can include data where expected information is missing or incomplete. Box 210 represents a trace of data stored in trace buffer 208.

Trace buffer 208 therefore contains the data that was present on the data line 202 when a triggering event was detected by the trace module 204. The implementation of trace buffer 208 can vary. In one embodiment, trace buffer 208 is a circular buffer that implements a first-in-first-out ("FIFO") scheme. A circular buffer can implement a first-in-first-out scheme by using an input pointer and an output pointer that are incremented each time a data element is processed, in a first-in/first-out manner. Upon reaching the end of a buffer, the pointers wrap around to the beginning of the buffer. In other words, trace buffer 208 is continuously collecting new data that overwrites some of the old data. In this way, some of the data that was present in trace buffer 208 prior to the triggering event remains in trace buffer 208.

Serial data is received by protocol analyzer 200 by way of data line 202. Generally, the data stored in trace buffer 208 of trace module 204 of protocol analyzer 200 can be (i) data received before the reception of the data constituting the triggering event, (ii) the data constituting the triggering event, (iii) the data received after the reception of the data constituting the triggering event, or (iv) a combination of (i), (ii) and/or (iii). For example, a large portion of the data in trace buffer 208 can be data that was received after the reception of the data constituting the triggering event. Likewise, a small portion of the data in trace buffer 208 can be data that was received before the reception of the data constituting the triggering event.

After a trace of data is captured in trace buffer 208, the trace of data is ready for analysis. Analysis of some or all of the data stored in trace buffer 208 enables a user of protocol analyzer 200 to identify, by way of example, performance problems, system bus protocol problems, upper layer protocol problems, and logical and physical layer problems. In one implementation, all of the data in trace buffer 208 is analyzed before results of the analysis are presented on a user interface, such as user interface 104 of FIG. 1.

In another implementation, only that portion of the data in trace buffer 208 which constitutes an identified event is analyzed. Thus, a problem can potentially be solved without having to analyze all of the data in trace buffer 208. In other words, an analysis of only a portion of the data in trace buffer 208 may be sufficient.

Protocol analyzer 200 also includes waveform module 206. Waveform module 206 includes an analog-to-digital converter 212, a filter 214, and a buffer 216 configured in a serial arrangement. Analog-to-digital converter 212 is configured to receive a stream of analog data from data line 202 and output a corresponding stream of digital data to filter 214. More particularly, analog-to-digital converter 212 converts the input stream of analog data to an output stream of digital data that represents variations in a signal characteristic of the stream of analog data over time. The signal characteristic represented in the stream of digital data can be, for example, a signal voltage of the stream of analog data. The sampling rate of analog-to-digital converter 212 can be configurable by a user. For example, the sampling rate can be set by a user to receive input from data line 202 every 4 nanoseconds, every 8 nanoseconds, or every 40 nanoseconds.

Filter 214 of waveform module 206 of protocol analyzer 200 is configured to receive the stream of digital data from analog-to-digital converter 212 and output only a sample of the stream of digital data. The sample of the stream of digital data output by filter 214 is determined by the detection of a particular trigger event. The particular trigger event can be any user-specified or system specified event, as disclosed herein in connection with trace module 204. Likewise, the sample of the stream of digital data output by filter 214 can be (i) the data received before the reception of the data constituting the triggering event, (ii) the data constituting the triggering event, (iii) the data received after the reception of the data constituting the triggering event, or (iv) a combination of (i), (ii) and/or (iii).

One example triggering event for which filter 214 can be configured to monitor is where a waveform reaches or exceeds a user-specified threshold voltage. For example, where an acceptable voltage can vary between 0 volts and 5 volts, a user can specify an upper threshold voltage of 5.1 volts as a triggering event for which filter 214 should monitor. Where the voltage displayed as a waveform reaches 5.1 volts or becomes greater than 5.1 volts, then filter 214 will detect the user-specified triggering event. In another example, a user can specify a lower threshold voltage of −0.1 volts as a triggering event for which filter 214 should monitor. Where the voltage displayed as a waveform reaches −0.1 volts or becomes less than −0.1 volts, then filter 214 will detect the user-specified triggering event. The triggering event for which filter 214 is configured to monitor can be the same as the triggering event for which trace module 204 is configured to monitor. Alternatively, the triggering event for which filter 214 is configured to monitor can be different from the triggering event for which trace module 204 is configured to monitor.

Buffer 216 of waveform module 206 of protocol analyzer 200 is configured to receive the sample of the digital data output by filter 214 and to store the received sample of digital data for later retrieval and display on a user interface. Box 218 represents one example of a sample of data stored in buffer 216. The values of the sample of data stored in buffer 216 represent 2500 microvolts, 3000 microvolts, 6000 microvolts and 3700 microvolts, respectively.

Figure 3:
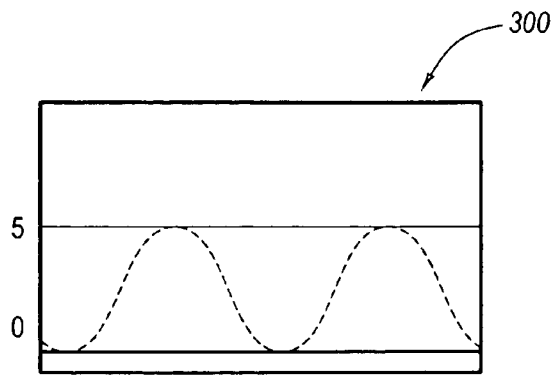
FIG. 3 discloses an exemplary display of a waveform.

FIG. 3 discloses an example display 300 that shows a waveform corresponding to data stored in buffer 216. The horizontal axis of display 300 represents time and the vertical axis of display 300 represents the data stored in buffer 216. The data stored in buffer 216 represents variations over time of a signal characteristic of the analog data received by protocol analyzer 200 over data line 202. In one example, the data stored in buffer 216 represents the voltage over time of the stream of analog data received by protocol analyzer 200. Where the input voltage departs from zero, the portion of the waveform displayed on display 300 corresponding to the time at which the input voltage departed from zero is deflected either upwards or downwards. For example, the waveform disclosed in display 300 of FIG. 3 begins with a voltage between 0 V and 1 V on the far left of display 300. The voltage then drops to 0 V, rises to 5 V, drops to 0 V, rises to 5 V, and then drops to between 0 V and 1 V on the far right of display 300. Display 300 is erased periodically and refreshed with new data as the data is stored in buffer 216. Alternatively, display 300 can also graph voltage against time with the present plotted at a varying position which moves from left to right across the display. When the varying position reaches the right side of the display, it automatically cycles back to the left side of the display and continues moving from left to right across the display. In this alternative embodiment of display 300, the most recent past is displayed to the left of the varying position, and the less recent past is displayed to the right of the varying position.

Trace module 204 and waveform module 206 can be configured to function in conjunction with each other. For example, the triggering event for which filter 214 of waveform module 206 is configured to monitor can be the same as the triggering event for which trace module 204 is configured to monitor. When the triggering events for filter 214 and trace module 204 are identical, the sample of digital data output by filter 214 and stored in waveform buffer 216 will correspond to the trace of data collected by trace module 204 and stored in trace buffer 208. In addition, when an analysis of the data in trace buffer 208 is being presented on display 106 of user interface 104 of protocol analyzer 200, display 106 can allow a user to select a given event presented in the analysis in order to have display 106 present a waveform that corresponds to data stored in buffer 216. Likewise, when a waveform corresponding to the data stored in buffer 216 is being presented on display 106 of user interface 104, display 106 can allow the user to select a given event in the waveform in order to have display 106 present a protocol analysis of corresponding data stored in trace buffer 208. This selection of a given event can be accomplished by allowing the user to manipulate a pointing device, such as a mouse, to point and click on display 106 of user interface 104 to a particular portion of the data stored in buffer 208 or buffer 216, or to a particular point in the analysis or waveform corresponding to the data stored in buffer 208 of buffer 216. Likewise, other user interfaces with similar functionality couple be employed to accomplish the selection of a given event.

III. Exemplary Method for Recording and Outputting a Waveform

Figure 4:
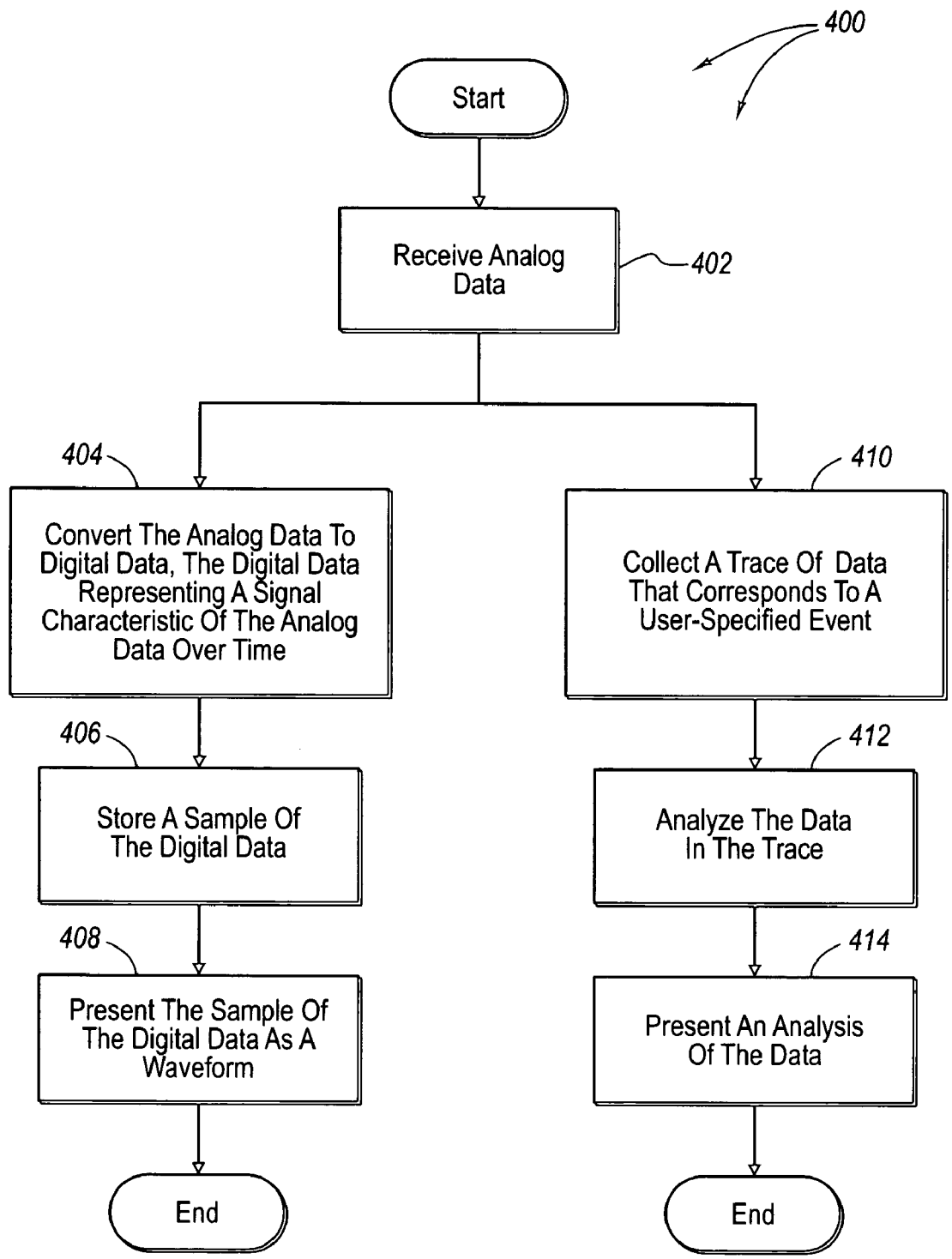
FIG. 4 discloses an exemplary method for recording and outputting a waveform in a protocol analyzer.

FIG. 4 discloses an exemplary method 400 for recording and outputting a waveform. Method 400 includes: stage 402, receiving analog data; stage 404, converting the analog data to digital data, the digital data representing variations in a signal characteristic of the analog data over time; stage 406, storing a sample of the digital data in a memory of a protocol analyzer; stage 408, presenting the sample of the digital data as a waveform on a user interface of the protocol analyzer; stage 410, collecting a trace of data that constitutes a user-specified event; stage 412, analyzing the data in the trace; and stage 414, presenting an analysis of the data on the user interface of the protocol analyzer.

An example of method 400 will now be discussed in connection with FIGS. 1-3. At stage 402, waveform module 206 of protocol analyzer 200 receives a stream of analog data by way of data line 202. At stage 404, analog-to-digital converter 212 of waveform module 206 converts the stream of received analog data to a stream of digital data, the digital data representing variations in a signal characteristic of the analog data over time. In this example, the signal characteristic represented in the stream of digital data is the signal voltage of the stream of analog data.

At stage 406, filter 214 receives the stream of digital data from analog-to-digital converter 212 as input and generates as output a sample of the stream of digital data. The sample in this example can include all of the data in the stream of digital data received as input or only some portion of the data in the stream of digital data received as input. The sample of digital data output by filter 214 is then stored in buffer 216 by waveform module 204. The storing of the sample of digital data in buffer 216 can be accomplished using a circular first-in-first-out scheme.

At stage 408, waveform module 204 presents the sample of digital data stored in buffer 216 as a waveform on user interface 104. As disclosed herein, user interface 104 can be any conceivable type of user interface, including, but not limited to, a graphical user interface. For example, the sample of digital data can be presented as a waveform on display 106 of user interface 104 in a manner similar to the display 300 in FIG. 3.

Substantially simultaneously to the performance of the processes corresponding to stages 402-408, trace module 204 in this example can perform the processes indicated at stages 410-414. Particularly, trace module 204 can collect, at stage 410, a trace of data that constitutes a user-specified event; analyze, at stage 412, the data in the trace; and present, at stage 414, the analysis of the data on the user interface. At stage 408, waveform module 204 can then present, as a waveform, a portion of the digital data that constitutes the user-specified event in the trace of data.

IV. Another Exemplary Method for Recording and Outputting a Waveform

Figure 5:
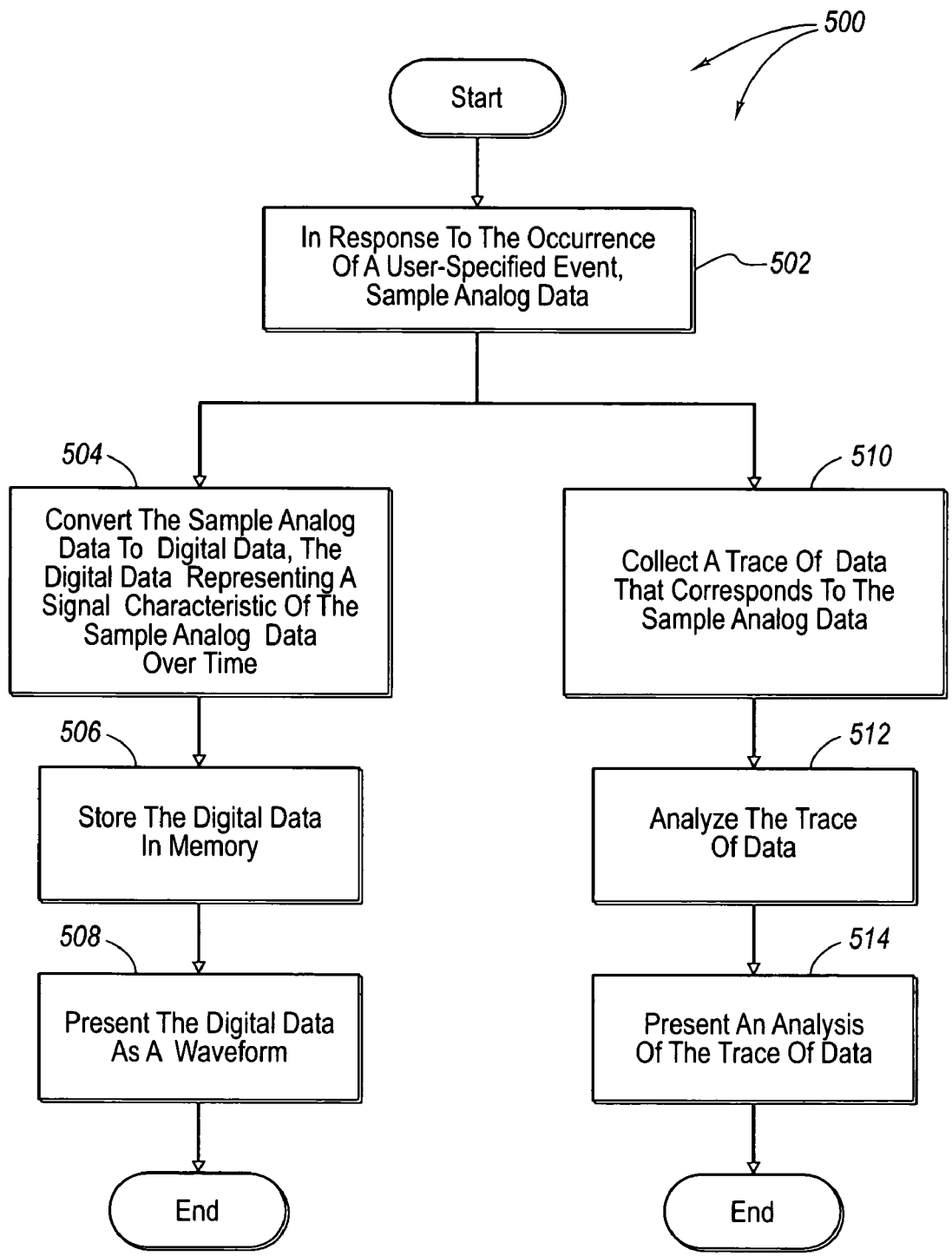
FIG. 5 discloses another exemplary method for recording and outputting a waveform in a protocol analyzer.

FIG. 5 discloses another exemplary method 500 for recording and outputting a waveform. Method 500 includes: stage 502, sampling analog data in response to the occurrence of a user-specified event; stage 504, converting the analog data to digital data, the digital data representing variations in a signal characteristic of the analog data over time; stage 506, storing the digital data in a memory of a protocol analyzer; stage 508, presenting the digital data as a waveform on a user interface of the protocol analyzer; stage 510, collecting a trace of data that corresponds to the sample analog data; stage 512, analyzing the trace of data; and stage 514, presenting an analysis of the data on the user interface of the protocol analyzer.

An example of method 500 will now be discussed in connection with FIGS. 1-2. Since some portions of method 500 are similar to some portions of method 400, this example will focus primarily on those portions of method 500 that are distinct from method 400. At stage 502, waveform module 206 of protocol analyzer 200 samples a stream of analog data from data line 202 in response to the occurrence of a user-specified event. Method 500, therefore, involves waveform module 206 monitoring the data on data line 202, and only receiving data into analog-to-digital converter 212 after the occurrence of a user-specified event is detected. The occurrence of a user-specified event detected at stage 502 can include the waveform of the analog data from analog data line 202 reaching or exceeding a user-specified threshold voltage.

Substantially simultaneous to the performance of the processes corresponding to stages 502-508, trace module 204 in this example can perform the processes indicated at stages 510-514. Particularly, trace module 204 can collect, at stage 510, a trace of data that corresponds to the sample analog data; analyze, at stage 512, the trace of data; and present, at stage 514, the analysis of the data on a user interface. At stage 508, waveform module 204 can then present the analysis of a portion of the trace of data that constitutes the user-specified event in the digital data.

The exemplary protocol analyzer 200 and the exemplary methods 400 and 500 can therefore be used to more readily correlate information obtained by a protocol analyzer and information obtained by a scope, and to present that correlated information to a user in a useful form.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for recording and outputting a waveform, the method comprising:
   receiving analog data;
   converting the analog data to digital data, the digital data representing variations in a signal voltage of the analog data over time;
   storing a sample of the digital data in a memory of a protocol analyzer;
   presenting the sample of the digital data as a waveform on a user interface of the protocol analyzer;
   collecting a trace of data that constitutes a user-specified event;
   analyzing the data in the trace; and
   presenting an analysis of the data on the user interface of the protocol analyzer, wherein presenting the sample of the digital data as a waveform comprises presenting as a waveform a portion of the digital data that constitutes the user-specified event in the trace of data.

2. The method as recited in claim 1, wherein storing the digital data in memory comprises storing the digital data consistent with a FIFO scheme.

3. The method as recited in claim 1, wherein presenting the digital data as a waveform comprises presenting the digital data visually as a waveform.

4. A protocol analyzer that is configured to record and output a waveform, the protocol analyzer comprising:
   an analyzer module comprising a trace buffer;
   a waveform capture module comprising:
      an analog-to-digital converter whose input comprises an analog data stream and whose output comprises a digital data stream that corresponds to the analog data stream, the digital data stream representing variations in a signal voltage of the analog data stream over time;
      a filter whose input comprises the digital data stream output from the analog-to-digital converter and whose output comprises those portions of the digital data stream that correspond to a user-specified event; and
      a memory whose input and output comprise the portions of the digital data stream output from the filter; and
      a user interface whose input comprises the portions of the digital data stream output of the memory and whose output comprises the portions of the digital data stream output of the memory presented as a waveform.

5. The protocol analyzer as recited in claim 4, wherein the user interface comprises a graphical user interface.

6. The protocol analyzer as recited in claim 4, wherein the stored digital data is consistent with a FIFO scheme.

7. The protocol analyzer as recited in claim 4, wherein the output of the user interface further comprises data stored in the trace.

8. The protocol analyzer as recited in claim 4, wherein the data stored in the trace corresponds to the portions of the digital data stream output from the filter and stored in the memory.

* * * * *